United States Patent Office 2,750,270
Patented June 12, 1956

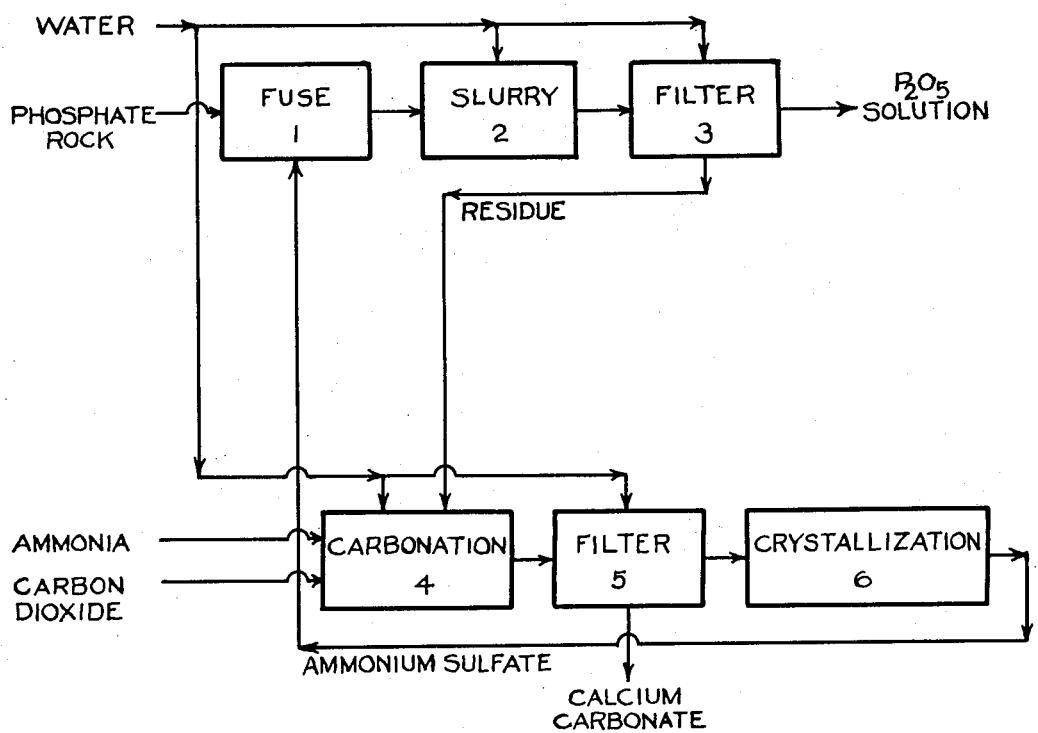

2,750,270
PRODUCTION OF SOLUBLE PHOSPHATES

Marion D. Barnes, El Dorado, Ark., assignor, by mesne assignments, to Monsanto Chemical Company, St. Louis, Mo., a corporation of Delaware Application April 27, 1953, Serial No. 351,246

14 Claims. (Cl. 71—34)

This invention relates to the production of soluble phosphates. The invention relates more specifically to the production of soluble phosphates from ammonium sulfate and calcium-phosphorus containing material such as e. g. phosphate rock. One embodiment of the invention relates to making fertilizers.

By the expressions "soluble phosphatic material" and "soluble phosphate" as used herein are meant water soluble as well as citrate soluble phosphatic materials. The ratios of ammonium sulfate to phosphate rock as used herein is the ratio of these materials charged to the reactor.

The $P_2O_5$ yield is given herein as the amount of soluble phosphate recovered from the phosphate rock, the yield being expressed as per cent by weight of the $P_2O_5$ originally in the rock unless otherwise specified.

In describing the fusion step of this invention, "stage" refers to the mixing of the materials to be processed in the fusion step, and "pass" refers to the number of times a mixture is passed through the reactor during the fusion step. The following examples illustrate various type fusions. (1) In a 1 stage—1 pass fusion a mixture of ammonium sulfate and phosphate rock is prepared by using the total amount of ammonium sulfate desired and then passing this mixture through the reactor once. (2) In a 1 stage—2 pass fusion the mixing procedure is the same as in (1) above but the mixture is passed through the reactor twice. (3) In a 2 stage—2 pass fusion a mixture (a) of ammonium sulfate and phosphate rock is prepared by using ½ the total amount of ammonium sulfate ultimately desired, passing this mixture (a) through the reactor and thereby obtaining mixture (b), mixing with (b) the remaining ½ of the ammonium sulfate and thereby obtaining mixture (c), and finally passing mixture (c) through the reactor.

In most processes for the manufacture of available phosphate for fertilizers both of the following two major accomplishments must be effected. First, in all such processes it is necessary to decompose the apatite structure of the calcium-phosphorous containing material such as phosphate rock and thus render the $P_2O_5$ content of the rock available to plants as a food. Secondly, in most such processes it is necessary to separate the calcium oxide from the resulting mixture to such extent that the ratio of about 3.5 to 1 of calcium oxide to $P_2O_5$ in the initial phosphate rock will be reduced to a value in the resulting phosphatic material sufficiently low to minimize the reversion of the phosphatic mixture to tricalcium phosphate due to changing environment and conditions of said mixture, tricalcium phosphate being relatively unavailable to plants. In conventional fertilizer manufacture, acidulation of phosphate rock with sulfuric acid almost without exception has been the means for obtaining the two above objectives. While in the conventional process of making regular superphosphate, the calcium oxide is not separated from the $P_2O_5$, a major part of it is effectively tied up as calcium sulfate so that substantially no reversion takes place except under extreme conditions. However, because of the increasing demand for higher analysis fertilizers and because of the increasing shortage and cost of sulfuric acid, the sulfuric acid process (the so-called wet process) for making fertilizers (regular and treble super phosphates) has serious drawbacks. Therefore, there is a pressing need for a process which avoids these drawbacks, i. e. a process for economically producing high analysis fertilizers without the use of sulfuric acid.

The prior art includes processes involving nitric acid which have been suggested to alleviate this problem. The products of most of these processes are not of good physical condition, i. e. they usually contain calcium nitrate and thereby absorb moisture at relatively low humidity and become quite wet and sticky, thus presenting problems of distribution and handling.

My copending application Serial No. 277,995, filed March 22, 1952, entitled "Fertilizer Manufacture" comprises a process of manufacturing phosphatic fertilizer material using nitric acid. The phosphatic product is of good physical condition since it contains substantially no calcium nitrate. My copending application Serial No. 277,996, filed March 22, 1952, entitled "Fertilizer Manufacture and Uranium Recovery" comprises a process of manufacturing phosphatic fertilizers without the use of any acid or sulfate in any form, which is accomplished by recycling a portion of the phosphatic product as a processing material. While these two processes work quite well, they are not entirely satisfactory. The first process still depends on acid; and although the second process avoids the use of acids and sulfate, handling difficulties are involved. In the fusion step there is a tendency for the mixture of phosphate rock and recycled phosphatic material to become a gummy, sticky mass. While not serious, it is desirable to minimize these difficulties. In addition, it is desirable to find some way to reduce the amount of recycle phosphatic material.

An object of this invention is to provide a process for making soluble phosphates. A further object is to provide a process for the production of soluble phosphates from phosphate rock without consuming acid and with minimum handling difficulties. An additional object is to reduce the amount of recycle material. The above and other objects will be apparent from the description of this invention given hereinafter.

The above and other objects are accomplished according to this invention broadly by carrying out the process which comprises the following steps.

1. Fusing calcium-phosphorus containing material and a material consisting essentially of the residue from step five below, which is primarily ammonium sulfate, 2 and 3. Separating the water-solubles from the resulting fusion material, leaving behind a water-insoluble residue, 4. Reacting aqueous ammonium carbonate solution with the residue from steps two and three, 5. Separating the resulting solution from the resulting insoluble material, 6. Evaporating the solution substantially to dryness, 7. Recycling the residue from step five to the fusion step.

The raw materials used in the invention depend on the particular product being made. However, in all cases, calcium-phosphorus containing material (e. g. phosphate rock), carbon dioxide, water and make-up ammonia and ammonium sulfate are used as raw materials. Also ammonia is employed in all cases, but it is considered as raw material only in cases in which it is consumed to a substantial extent (the criterion used to define raw material in this invention), and this occurs only in making certain products, e. g. ammonium phosphate. While ammonium sulfate is always employed, it is never consumed to this extent. Thus, in all cases ammonium sulfate, and in many cases ammonia, serves primarily as a processing medium and is not consumed to any substantial degree. Make-up ammonium sulfate may be added as such or as gypsum. The principal by-product of the invention is calcium carbonate.

As pointed out above, ammonium sulfate is used as a processing material and is not consumed to any substantial degree. This is of particular importance since, in effect, ammonium sulfate takes the place of acids, such as e. g. sulfuric acid and nitric acid, as the means of solubilizing the $P_2O_5$ in phosphate rock, and yet the ammonium sulfate is not itself consumed. Usually the nitric acid or sulfuric acid employed to solubilized the $P_2O_5$ contained in phosphate rock is consumed and not available for reuse.

A preferred embodiment of this invention will now be described broadly with reference to the flow sheet, as comprising two phases. The first phase involves solubilizing and recovering the $P_2O_5$ from phosphate rock, and the second phase involves recovering the sulfate employed as a processing material. In step 1 a mixture including phosphate rock and ammonium sulfate is heated, e. g. in a rotary kiln. In step 2, the granular fusion material, comprising soluble phosphate, insoluble calcium sulfate and other water-insolubles, issuing from the kiln, is slurried with water. In step 3, the insoluble materials are filtered out of the soluble $P_2O_5$. In steps 4–6 the sulfate is recovered from the insolubles from step 3 by reacting them with ammonium carbonate, filtering out the resulting insolubles (primarily calcium carbonate) as by-product, evaporating the filtrate substantially to dryness, and recycling to the fusion step the thus crystallized ammonium sulfate, which may contain some ammonium phosphate.

More specifically, as the examples given hereinafter will indicate, the preferred conditions of the fusion step comprise a kiln temperature of 450° C.–515 C., a ratio of ammonium sulfate to phosphate rock of 1.25:1, and a residence time in the kiln of 6–10 minutes.

In order to determine the effect of the above and certain other variables on the results obtainable under this invention, a number of experiments were carried out. The specific conditions and results are given in the examples hereinafter. Unless otherwise indicated, the 2 stage-2 pass method of fusion defined here inbefore was employed. These examples illustrate specific embodiments of this invention, but the invention is not limted thereto except as defined in the appended claims. Per cent and ratio are by weight. Commercial grind phosphate rock was used.

Regarding the procedure, ammonium sulfate was thoroughly mixed with phosphate rock and the mixture heated in a rotary kiln. The resulting fusion material issuing from the kiln was analyzed in order to determine how much of the $P_2O_5$ originally contained in the rock had been solubilized. The analytical procedure arrives at the per cent $P_2O_5$ solubilized by determining the difference between the total $P_2O_5$ content of the fusion material and the insoluble $P_2O_5$ therein. Although this analytical procedure differs somewhat from the description of this invention given hereinbefore relating to processing the fusion material, the results, expressed as per cent $P_2O_5$ solubilized, are comparable. The fusion material was analyzed in the following manner.

A 10 gram sample of the fusion material was dissolved by boiling in aqua regia and the resulting solution was diluted with water to 500 ml. The $P_2O_5$ in the solution was determined according to the "Official Methods of Analysis of the Association of Official Agricultural Chemists," 7th edition, 1950, p. 9, paragraph 2.13. The total $P_2O_5$ was expressed as weight per cent of the fusion material. Briefly this analytical method comprises precipitating the $P_2O_5$ from an aliquot of the 500 ml. solution with ammonium molybdate solution and titrating the precipitate with standard alkali and acid solutions in order to determine the actual amount of $P_2O_5$ in the aliquot.

By the above procedure the total amount of $P_2O_5$ was determined. In order to determine the amount of insoluble $P_2O_5$, another 10 gram sample of the fusion material was boiled for one hour in 100 ml. of water containing ½ ml. of concentrated sulfuric acid, filtered, and the residue washed with three successive 20 ml. portions of water. The residue then was dissolved in aqua regia, diluted to 500 ml. with water, and an aliquot taken. Using the A. O. A. C. method just described on this aliquot, the weight per cent of insoluble $P_2O_5$ was determined.

From the above two analyses it was calculated how much of the $P_2O_5$ initially in the phosphate rock had been solubilized by the process. The following equation was used in making the calculation.

$$\text{Percent } P_2O_5 \text{ solubilized} = \frac{(\text{Percent total } P_2O_5 \text{ in F. M.}^1 - \text{Percent insol.} P_2O_5 \text{ in F. M.}^1) \times 100}{\text{Percent Total } P_2O_5 \text{ in F. M.}^1}$$

[1] F. M. refers to fusion material.

I could have determined $P_2O_5$ yield by analyzing directly for soluble $P_2O_5$. However, my experience has shown that such a method gives greater amounts of $P_2O_5$ solubilized than the above described method.

EXAMPLE 1

*Temperature of fusion step*

| Run # | Temp., °C. | Ratio, $(NH_4)_2SO_4$/ P. R.[1] | Feed Rate, Parts/ Min. | Residence Time, Min. | Yield, Percent $P_2O_5$ |
|---|---|---|---|---|---|
| 137–8 | 400 | 1.25 | 0.71 | 6 | 75.4 |
| 137–16 | 450 | 1.25 | 0.61 | 6 | 86.9 |
| 137–43 | 475 | 1.25 | 0.43 | 6 | 86.3 |
| 137–31 | 475 | 1.25 | 0.62 | 6 | 81.9 |
| 137–34 | 475 | 1.25 | 0.58 | 6 | 87.1 |
| 137–44 | 475 | 1.25 | 0.43 | 6 | 81.4 |
| 137–26 | 500 | 1.25 | 0.58 | 6 | 82.4 |
| 137–47 | 515 | 1.25 | 0.51 | 10 | 92.7 |
| 137–49 | 515 | 1.25 | 0.69 | 10 | 91.5 |
| 137–54–1 | 525 | 1.25 | 0.49 | 10 | 84.8 |
| 137–51 | 530 | 1.25 | 0.77 | 10 | 89.5 |

Thus in the fusion step a mixture comprising phosphate rock and recycle ammonium sulfate is passed through a rotary kiln. The temperature of the kiln is kept at above about 400° C., but below the temperature at which ammonia substantially decomposes. A temperature of about 450° C.–515° C. is preferred. It has been found that temperatures as low as 250° C. can be used, and while 250° C. is within the scope of this invention, the yields obtained with such a temperature are undesirably low. No signs of the kiln being attacked by corrosion were observed at any of these fusion temperatures. The kiln was made of mild steel.

EXAMPLE 2

*Residence time of fusion step*

| Run # | Temp., °C. | Ratio, $(NH_4)_2SO_4$/ P. R.[1] | Feed Rate, Parts/ Min. | Residence Time, Min. | Yield, Percent $P_2O_5$ |
|---|---|---|---|---|---|
| 137–26 | 500 | 1.25 | 0.58 | 6 | 82.4 |
| 137–54–1 | 525 | 1.25 | 0.49 | 10 | 84.8 |
| 137–54–2 | 525 | 1.25 | 0.49 | 15 | 79.0 |
| 137–54–3 | 525 | 1.25 | 0.49 | 20 | 79.6 |
| 137–54–4 | 525 | 1.25 | 0.49 | 25 | 77.6 |

[1] "P. R." is phosphate rock.

Although residence time, i. e. the time the mixture is maintained in the kiln, has a bearing on the yields obtained and therefore is important, it is not critical. Residence times of approximately 6–25 minutes have been used with good results.

EXAMPLE 3

*Ratio of ammonium sulfate to phosphate rock*

| Run # | Temp., °C. | Ratio, $(NH_4)_2SO_4$/ P. R.[1] | Feed Rate, Parts/ Min. | Residence Time, Min. | Yield, Percent $P_2O_5$ |
|---|---|---|---|---|---|
| 137-36 | 475 | 0.8 | 0.44 | 6 | 71.1 |
| 137-39 | 475 | 1.0 | 0.40 | 6 | 71.5 |
| 137-40 | 475 | 1.1 | 0.41 | 6 | 77.2 |
| 137-41 | 475 | 1.2 | 0.40 | 6 | 83.2 |
| 137-43 | 475 | 1.25 | 0.43 | 6 | 86.3 |
| 137-42 | 475 | 1.3 | 0.41 | 6 | 85.6 |

[1] "P. R." is phosphate rock.

Weight ratios of ammonium sulfate to phosphate rock of 0.8:1 to 1.3:1 have been used and are within the scope of this invention. A ratio of about 1.25:1 is preferred. With ratios lower than 1.25:1 the yields of $P_2O_5$ decrease. With ratios higher than 1.25:1 there is no increase in yield, and handling difficulties are apt to be encountered in that the mixture may become sticky and adhere to the kiln, too the material issuing from the kiln is apt to be lumpy rather than granular.

EXAMPLE 4

*Types of fusion*

| Run # | Temp., °C. | Ratio, $(NH_4)_2SO_4$/PR | Type Fusion | Feed Rate, Parts/ Min. | Residence Time, Min. | Yield, Percent $P_2O_5$ |
|---|---|---|---|---|---|---|
| 137-17-1 | 450 | 1.25 | 1 stage-1 pass. | 0.66 | 3 | 70.9 |
| 137-17-2 | 450 | 1.25 | 1 stage-2 pass. | 0.66 | 6 | 72.2 |
| 137-6 | 450 | 1.25 | 2 stage-2 pass. | 0.22 | 6 | 86.9 |

The particle size of the phosphate rock affects the physical nature of the ammonium sulfate-phosphate rock mixture during fusion. It was observed that with micronized phosphate rock higher ratios of ammonium sulfate to phosphate rock could be employed without the mixture becoming sticky and adhering to the kiln walls than was the case with commercial grind phosphate rock. The micronized rock was of such size that substantially all of it passed a 325-mesh screen. Commercial grind rock is a rock of such particle size that 80%–95% of it passes a 100-mesh screen. This size rock is well-known and widely used in the fertilizer art. With commercial grind phosphate rock it was found that this tendency toward sticking was substantially lessened by using a 2 stage-2 pass type fusion.

Since a number of different fusion methods will become obvious to those skilled in the art, it is not intended that this invention be limited to the specific methods given in the above Example 4. For instance, to effect a 2 stage-2 pass type fusion two kilns or other type reactors in series could be employed rather than using a single reactor twice. A further means of carrying out the fusion would be to add the ammonium sulfate to the reactor at several different points along the length of the reactor while charging the rock into one end of the reactor; this would result in a multistage-multipass type fusion equivalent to any number of stages and passes desired. Still another means of carrying out the fusion step includes passing the material to be fused through a reactor on an endless belt. The fusion can also be carried out on the exterior surface of a hot rotating cylinder.

EXAMPLE 5

Using the preferred conditions as determined in the preceding examples, a run was made in which a material balance was obtained on the $SO_4$ and $P_2O_5$ charged to the process. A 2 stage-2 pass type fusion was used in which 12.5 parts ammonium sulfate and 10 parts phosphate rock (34.2% $P_2O_5$) were fed into a rotary kiln at the rate of 0.72 part per minute. The kiln was maintained at a temperature of about 515° C.–530° C.

During the fusion in this particular experiment no effort was made to recover the gases and other materials (e. g., ammonia, carbon dioxide, sulfate and phosphate) which were freely escaping from the kiln to the atmosphere. However, in most applications of this invention it would be desirable, primarily from an economic standpoint, to recover and recycle these materials to the process. Various means whereby this may be done will be readily apparent to those skilled in the art.

A residence time of 5 minutes per pass was maintained. The fusion material was slurried with 37.6 parts water, boiled 30 minutes, filtered and the filter cake (water-insoluble residue) washed twice with 15 parts water each time. Analyses of the combined filtrate and water washes showed 2.56 parts $P_2O_5$ and 0.53 part $SO_4$ had dissolved in the water. The combined filtrate and water washes was divided into two parts. One part was treated with ammonia to pH 3.8 and then evaporated to dryness. A product containing 7.7% nitrogen and 54.0% $P_2O_5$ was obtained, 99.5% of the $P_2O_5$ being citrate-soluble and 79.7% of the $P_2O_5$ being water-soluble. The other part was taken to pH 6.0 with ammonia and then evaporated to dryness. A product containing 14.1% nitrogen and 44.2% $P_2O_5$ was obtained, 99.6% of the $P_2O_5$ being citrate-soluble and 77.6% of the $P_2O_5$ being water-soluble. Both of these products possessed good physical properties, i. e. they were non-hydroscopic, free-flowing and otherwise well suited for fertilizer material. Obviously, by adding more or less ammonia to the water solution than shown in this example, products containing a wide range of ratios of nitrogen to $P_2O_5$ may be produced. The water-insoluble residue was ground in a ball mill for 6 hours together with 45.1 parts ammonium bicarbonate, 33.8 parts 28% aqua ammonia, and 113 parts water. This milled slurry was then filtered and the filter cake (carbonate insoluble residue) washed three times with 15 parts water each time. By analysis of the combined carbonate filtrate and water washes, it was found that 0.22 part $P_2O_5$ and 6.13 parts $SO_4$ had dissolved in the carbonate solution. Upon drying the carbonate insoluble residue, 8.6 parts of by-product (mainly calcium carbonate) was recovered. This by-product, by analysis, contained 0.5 part $P_2O_5$ and 0.34 part $SO_4$. The results of this example are summarized in the following table.

| Distribution | Recovery | | | | | | |
|---|---|---|---|---|---|---|---|
| | Parts $P_2O_5$ | Parts $SO_4$ | Parts Ca | Parts N | Parts Fe and Al | Percent of $SO_4$ | Percent of $P_2O_5$ |
| Water solution | 2.56 | 0.53 | 0.15 | 0.15 | 0.98 | 5.8 | 74.8 Product. |
| Carbonate solution. | 0.22 | 6.13 | 0.0 | | 0.0 | 67.5 | 6.4 Recycle. |
| Insoluble residue. | 0.50 | 0.34 | | | | 3.7 | 14.6 By-prod. |
| Totals | 3.28 | 7.00 | | | | 76.9 | 95.8 |

It will be readily apparent that by simple calculation, using the tabulated data in Example 5 above, one will find the $CaO/P_2O_5$ ratio in the water solution to be only 0.21/1. This is a great reduction from the 3.5/1 ratio originally found in the phosphate rock, thus proving this process to be an effective means of separating calcium and $P_2O_5$ as found in phosphate rock.

EXAMPLE 6

*Use of ammonium phosphate in the ammonium sulfate-phosphate rock fusion mixture*

| Run # | Temp., °C. | Wt. Ratio, $(NH_4)_2SO_4$/PR | Wt. Ratio, $NH_4H_2PO_4$/PR | Feed Rate, parts/min. | Residence Time, Min. | Yield Percent $P_2O_5$ |
|---|---|---|---|---|---|---|
| 137-63 | 525 | 0.94 | 0.31 | 0.77 | 10 | 83.0 |

As shown by the above tabulation, mixtures of ammonium phosphate with phosphate rock may also be used in the fusion step. A mixture containing 3 parts ammonium sulfate to 1 part ammonium phosphate was found to give good results.

Examples 1–5 above show the embodiment of this invention wherein a two component mixture of ammonium sulfate with phosphate rock is fused. Example 6 above shows the embodiment of this invention wherein a three component mixture of ammonium sulfate and ammonium phosphate with phosphate rock is fused. The finding that such a three component mixture can be used is significant since it makes it unnecessary to carry out the undesirably costly and difficult step of separating out all the ammonium phosphate from the recycle ammonium sulfate. In any event, in order to obtain the best yields, at least enough ammonium sulfate is needed to combine with substantially all the calcium in the phosphate rock being fused.

According to the present invention, the recycling material is obtained by reducing the filtrate from step 5 of the drawing substantially to dryness, e. g. by evaporation. Any makeup sulfate required in this invention can be added as gypsum in the carbonation step (step 4) and recovered as recycling material as just described. The recycle material thus recovered is mixed with phosphate rock and charged to the kiln for processing.

While this invention has been described hereinbefore with reference to a preferred embodiment thereof wherein $P_2O_5$ has been solubilized and obtained in water solution substantially free of calcium, the invention may be carried further to make a variety of products, e. g. other soluble phosphates. More specifically, the water solution of $P_2O_5$ may be processed to make, e. g. monoammonium phosphate, diammonium phosphate, triammonium phosphate, alkali metal phosphates including sodium phosphate and potassium phosphate, and the like.

Sodium phosphates are prepared from the water solution of $P_2O_5$ by procedures well-known in the phosphate industry. The manufacture of trisodium phosphate is carried out in two steps:

(1) $Na_2CO_3 + H_3PO_4$[1] $\rightarrow Na_2HPO_4 + CO_2 + H_2O$ (2) $Na_2HPO_4 + NaOH \rightarrow Na_3PO_4 + H_2O$

[1] Substitute applicant's water solution of $P_2O_5$.

A slight excess of sodium carbonate is added to the water solution of $P_2O_5$ and the resulting mixture is boiled until substantially all of the $CO_2$ has been driven off. The thus formed disodium phosphate solution is filtered to remove the small amounts of calcium, iron and aluminum phosphates precipitated by the soda ash neutralization. The disodium phosphate contained in the filtrate is converted to trisodium phosphate by the addition of sodium hydroxide at about 90° C. This hot solution is filtered and trisodium phosphate is crystallized from the filtrate. Potassium phosphates are prepared in a similar manner.

In making monoammonium phosphate from the water solution of $P_2O_5$, the solution may be treated with the required quantity of ammonia to produce the monoammonium phosphate, which may be recovered by well-known methods, e. g. by crystallization. If crystallization is employed as a means of recovering the monoammonium phosphate, the mother liquor from the crystallization may be used instead of water for extracting soluble $P_2O_5$ from the fusion material (step 2). In fact, excellent results have been obtained by operating with the mother liquor saturated with ammonium sulfate and ammonium phosphate at about 60° C., slurrying this mother liquor with the fusion material at a temperature of about 75° C.–100° C., filtering out the insoluble residue (consisting primarily of calcium sulfate) at the latter temperature range, ammoniating and cooling the filtrate to about 60° C. to crystallize ammonium phosphate.

Alternatively, instead of extracting the $P_2O_5$ from the fusion material with water or mother liquor, as described above, the $P_2O_5$ can be extracted from the fusion material with acids, e. g. with aqueous solutions of nitric acid or sulfuric acid. The acid tends to remove additional $P_2O_5$ from the phosphate rock. When the fusion material is slurried with nitric acid, supplemental ammonium sulfate is also added to the slurry to precipitate calcium from the solution as calcium sulfate. Obviously, with sulfuric acid the calcium will be precipitated as calcium sulfate. In either case the sulfate value is eventually recovered, as shown in steps 4, 5, and 6 of the flow sheet, as ammonium sulfate.

As many apparently widely different embodiments of this invention may be made without departing from the spirit and scope thereof, it is to be understood that the invention is not limited to the specific embodiments thereof except as defined in the appended claims.

What is claimed is:

1. Process of preparing soluble phosphatic materials which comprises the steps of (1) fusing calcium-phosphorus containing material and a material consisting essentially of the residue from step five below, which is primarily ammonium sulfate, (2) separating the water-solubles from the resulting fusion material, leaving behind a water-insoluble residue, (3) reacting aqueous ammonium carbonate solution with said water-insoluble residue, (4) separating the resulting solution from the resulting insoluble material, (5) evaporating said resulting solution to obtain a substantially dry residue, and (6) recycling said dry residue to the fusion step.

2. Process of preparing soluble phosphatic materials which comprises the steps of (1) fusing a mixture including phosphate rock and a material consisting essentially of the residue from step five below, which is primarily ammonium sulfate, (2) separating the water-solubles, mostly phosphates, from the resulting fusion material, leaving behind a water-insoluble residue, (3) reacting aqueous ammonium carbonate solution with said water-insoluble residue and thereby forming a solution and an insoluble material, (4) separating the resulting solution from the insoluble material, (5) evaporating said resulting solution to obtain a substantially dry residue, and (6) recycling said dry residue to the fusion step.

3. Process of preparing soluble phosphatic materials which comprises the steps of (1) fusing a mixture including phosphate rock and a material consisting essentially of the residue from step five below, which is primarily ammonium sulfate, the fusion being carried out at a temperature of at least 250° C. but below the temperature at which ammonia decomposes, (2) separating the water-solubles, mostly phosphates, from the resulting fusion material, leaving behind a water-insoluble residue, (3) reacting aqueous ammonium carbonate solution with said water-insoluble residue and thereby forming a solution and an insoluble material, (4) separating the resulting solution from the insoluble material, (5) evaporating said resulting solution to obtain a substantially dry residue, and (6) recycling said dry residue to the fusion step.

4. Process of preparing soluble phosphatic materials which comprises the steps of (1) fusing a mixture including phosphate rock and a material consisting essentially of the residue from step five below, which is primarily ammonium sulfate, the fusion being carried out at a temperature of 400° C.–550° C., (2) separating the water-solubles, mostly phosphates, from the resulting fusion material, leaving behind a water-insoluble residue, (3) reacting aqueous ammonium carbonate solution with said water-insoluble residue and thereby forming a solution and an insoluble material, (4) separating the resulting solution from the insoluble material, (5) evaporating said resulting solution to obtain a substantially dry residue, and (6) recycling said dry residue to the fusion step.

5. Process of preparing soluble phosphatic materials which comprises the steps of (1) fusing a mixture including phosphate rock and a material consisting essentially of the residue from step five below, which is primarily ammonium sulfate, the ammonium sulfate/phosphate rock ratio being about 0.8/1–1.3/1, (2) separating the water-solubles, mostly phosphates, from the resulting fusion material, leaving behind a water-insoluble residue, (3) reacting aqueous ammonium carbonate solution with said water-insoluble residue and thereby forming a solution and an insoluble material, (4) separating the resulting solution from the insoluble material, (5) evaporating said resulting solution to obtain a substantially dry residue, and (6) recycling said dry residue to the fusion step.

6. Process of preparing soluble phosphatic materials which comprises the steps of (1) fusing a mixture including phosphate rock and about one-half of the total amount finally to be used of a material consisting essentially of the residue from step six below, which is primarily ammonium sulfate, (2) fusing a mixture including the fusion material from step one and the remaining one-half of said residue in step one, (3) separating the water-solubles, mostly phosphates, from the resulting fusion material, leaving behind a water-insoluble residue, (4) reacting aqueous ammonium carbonate solution with said water-insoluble residue and thereby forming a solution and an insoluble material, (5) separating the resulting solution from the insoluble material, (6) evaporating said resulting solution to obtain a substantially dry residue, and (7) recycling said dry residue to the fusion step.

7. Process of preparing soluble phosphatic materials which comprises the steps of (1) fusing a mixture including phosphate rock, ammonium phosphate, and a material consisting essentially of the residue from step five below, which is primarily ammonium sulfate, (2) separating the water-solubles, mostly phosphates, from the resulting fusion material, leaving behind a water-insoluble residue, (3) reacting aqueous ammonium carbonate solution with said water-insoluble residue and thereby forming a solution and an insoluble material, (4) separating the resulting solution from the insoluble material, (5) evaporating said resulting solution to obtain a substantially dry residue, and (6) recycling said dry residue to the fusion step.

8. Process of preparing soluble phosphatic materials which comprises the steps of (1) fusing a mixture including phosphate rock, ammonium phosphate, and about one-half of the total amount finally to be used of a material consisting essentially of the residue from step six below, which is primarily ammonium sulfate, (2) fusing a mixture including the fusion material from step one and the remaining one-half of said residue in step one, employing quantities of said materials to be fused such that the ratio of ammonium phosphate and said residue combined to phosphate rock is about 1.25/1, and employing a fusion temperature of 450° C.–515° C., (3) separating the water-solubles, mostly phosphates, from the resulting fusion material, leaving behind a water-insoluble residue, (4) reacting aqueous ammonium carbonate solution with said water-insoluble residue and thereby forming a solution and an insoluble material, (5) separating the resulting solution from the insoluble material, (6) evaporating said resulting solution to obtain a substantially dry residue, and (7) recycling said dry residue to the fusion step.

9. Process of preparing soluble phosphatic materials which comprises the steps of (1) fusing by passing through a reactor, phosphate rock and a material consisting essentially of the residue from step six below which is primarily ammonium sulfate, said residue being added at a plurality of points along the reactor, (2) slurrying the resulting fusion material with water, (3) filtering the slurry and thereby separating the water-solubles, mostly phosphates, from the fusion material, leaving behind a water-insoluble residue, (4) reacting aqueous ammonium carbonate solution with said water-insoluble residue and thereby forming a solution and an insoluble material, (5) separating the resulting solution from the insoluble material, (6) evaporating said resulting solution to obtain a substantially dry residue, and (7) recycling said dry residue to the fusion step.

10. Process of preparing soluble phosphatic materials which comprises the steps of (1) fusing a mixture including phosphate rock and a material consisting essentially of the residue from step seven below which is primarily ammonium sulfate, (2) slurrying the resulting fusion material with water, (3) filtering the slurry and thereby separating the water-solubles, mostly phosphates, from the fusion material, leaving behind a water-insoluble residue, (4) ammoniating the water-solubles and evaporating the thus formed mixture substantially to dryness, (5) reacting aqueous ammonium carbonate solution with said water-insoluble residue and thereby forming a solution and an insoluble material, (6) separating the resulting solution from the insoluble material, (7) evaporating said resulting solution to obtain a substantially dry residue, and (8) recycling said dry residue to the fusion step.

11. Process of preparing soluble phosphatic materials which comprises the steps of (1) fusing a mixture including phosphate rock and a material consisting essentially of the residue from step six below which is primarily ammonium sulfate, (2) slurrying the resulting fusion material with mineral acid, (3) filtering the slurry and thereby separating the water-solubles, mostly phosphates, from the fusion material, leaving behind a water-insoluble residue, (4) reacting aqueous ammonium carbonate solution with said water-insoluble residues and thereby forming a solution and an insoluble material, (5) separating the resulting solution from the insoluble material, (6) evaporating said resulting solution to obtain a substantially dry residue, and (7) recycling said dry residue to the fusion step.

12. Process of preparing soluble phosphatic materials which comprises the steps of (1) fusing a mixture including phosphate rock and a material consisting essentially of the residue from step six below which is primarily ammonium sulfate, (2) slurrying the resulting fusion material with a nitric acid-ammonium sulfate mixture, (3) filtering the slurry and thereby separating the water-solubles, mostly phosphates, from the fusion material, leaving behind a water-insoluble residue, (4) reacting aqueous ammonium carbonate solution wita said water-insoluble residue and thereby forming a solution and an insoluble material, (5) separating the resulting solution from the insoluble material, (6) evaporating said resulting solution to obtain a substantially dry residue, and (7) recycling said dry residue to the fusion step.

13. Process of preparing alkali metal phosphates which comprises the steps of (1) fusing a mixture including phosphate rock and a material consisting essentially of the residue from step eight below which is primarily ammonium sulfate, (2) slurrying the resulting fusion material with water, (3) filtering the slurry and thereby separating the water-solubles, mostly phosphates, from the fusion material, leaving behind a water-insoluble residue, (4) reacting the water-solubles with an alkali metal carbonate and thereby forming a solution of alkali metal phosphate and a precipitate consisting primarily of iron, aluminum and calcium phosphates, (5) separating the alkali metal phosphate solution from the precipitate, (6) reacting aqueous ammonium carbonate with said water-insoluble residue and thereby forming a solution and an insoluble material, (7) separating the resulting solution from the insoluble material, (8) evaporating said resulting solution to obtain a substantially dry residue, and (9) recycling said dry residue to the fusion step.

14. Process of preparing ammonium phosphate which comprises the steps of (1) fusing a mixture including phosphate rock and a material consisting essentially of the residue from step seven below which is primarily ammonium sulfate, (2) slurrying the resulting fusion material with mother liquor from step four, (3) filtering the slurry and thereby separating the water-solubles, mostly phosphates, from the fusion material, leaving behind a water-insoluble residue, (4) ammoniating the water-solubles and crystallizing ammonium phosphate therefrom, (5) reacting aqueous ammonium carbonate solution with said water-insoluble residue and thereby forming a solution and an insoluble material, (6) separating the resulting solution from the insoluble material, (7) evaporating said resulting solution to obtain a substantially dry residue, and (8) recycling said dry residue to the fusion step.

References Cited in the file of this patent
UNITED STATES PATENTS

| | | |
|---|---|---|
| 1,002,198 | Frerichs | Aug. 29, 1911 |
| 1,074,779 | Dunham | Oct. 7, 1913 |
| 1,251,742 | Blumenberg | Jan. 1, 1918 |
| 1,258,106 | Gardiner | Mar. 5, 1918 |
| 1,760,990 | Meyers | June 3, 1930 |
| 1,851,210 | Palazzo et al. | Mar. 29, 1932 |
| 1,856,187 | Johnson | May 3, 1932 |
| 2,086,912 | Kaselitz | July 13, 1937 |